United States Patent [19]

Beech

[11] 4,154,082
[45] May 15, 1979

[54] MANUFACTURE OF YOKES FOR DYNAMO ELECTRIC MACHINES

[75] Inventor: Keith J. W. Beech, West Midlands, England

[73] Assignee: Lucas Industries Limited, Birmingham, England

[21] Appl. No.: 846,156

[22] Filed: Oct. 27, 1977

[30] Foreign Application Priority Data

Nov. 6, 1976 [GB] United Kingdom ............... 46269/76

[51] Int. Cl.² .............................................. B21K 1/26
[52] U.S. Cl. ........................................ 72/370; 72/401; 72/402
[58] Field of Search ................. 72/370, 398, 401, 402; 113/120 M, 120 W; 310/194, 258, 259

[56] References Cited

U.S. PATENT DOCUMENTS

| 760,086 | 5/1904 | Storey | 310/194 |
| 1,816,859 | 8/1931 | Linders | 310/259 |
| 2,070,906 | 2/1937 | Kruse | 113/120 W |

FOREIGN PATENT DOCUMENTS 1679 of 1888 United Kingdom ..................... 72/398

Primary Examiner—Lowell A. Larson
Attorney, Agent, or Firm—Holman & Stern

[57] ABSTRACT

A method of manufacturing a yoke for a dynamo electric machine wherein a transversely divided two-part mandrel is inserted into a hollow ferromagnetic sleeve of wall thickness and diameter equal to that of the required yoke. The mandrel defines the shape of the poles to be produced on the yoke and a plurality of punches are driven radially inwardly towards the yoke to deform the material of the sleeve into the dies defined by the recesses of the punches.

7 Claims, 16 Drawing Figures

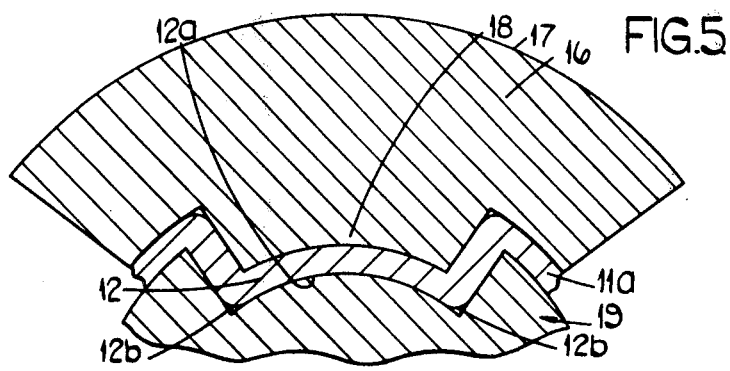
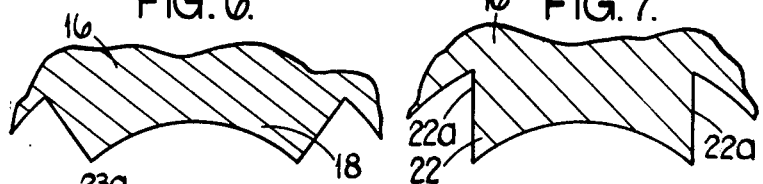
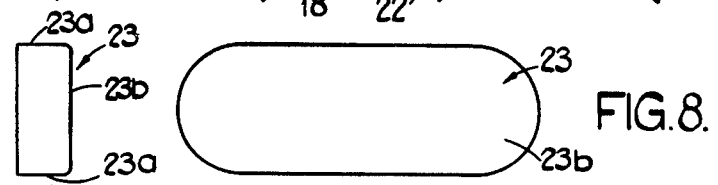
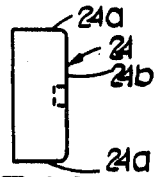 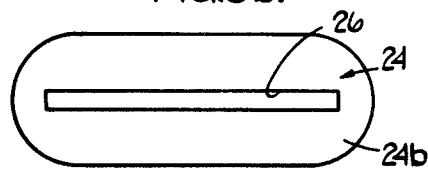
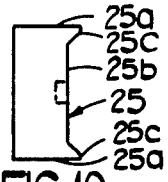 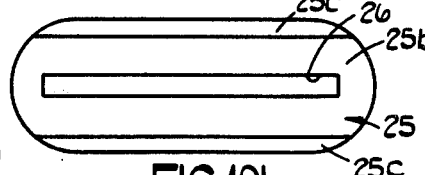
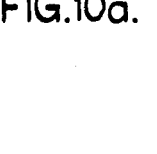 

MANUFACTURE OF YOKES FOR DYNAMO ELECTRIC MACHINES

This invention relates to the manufacture of yokes for dynamo electric machines.

It is known to form yokes for dynamo electric machines for example internal combustion engine starter motors, by stamping a flat strip to form the poles of the yoke integral with the strip and then rolling the strip to form a cylindrical yoke with the poles angularly spaced on its inner surface. This method has the disadvantages that the accuracy of the angular spacing of the poles is difficult to maintain within acceptable limits and that it is difficult to achieve concentricity between the inner surface of the yoke and the pole faces. It is also known to produce a yoke with integral poles from two or more part cylindrical shells but this method has the above disadvantages to a lesser extent and also the disadvantage of the need to secure the shells together in a cylindrical configuration. It is an object of the present invention to provide a method of manufacturing a yoke for a dynamo electric machine wherein the aforementioned disadvantages are minimised.

A method of manufacturing a yoke for a dynamo electric machine according to the invention includes inserting a transversely divided two part mandrel into a hollow ferromagnetic sleeve of wall thickness and diameter equal to that of the required yoke, the mandrel having therein a plurality of circumferentially spaced recesses, each recess defining a required pole shape and constituting a die, ensuring that the dies and a plurality of externally located punches are radially aligned, and moving the punches radially inwardly relative to the dies to indent the sleeve into said dies.

Preferably, each of said punches presents a flat face to the convex part cylindrical basal face of its respective die.

Desirably, the flat face of each punch is recessed adjacent its axial centreline whereby the work rate of the material of the sleeve during indenting in the region corresponding to said recess in the pole, is reduced permitting the punch to apply more force over the remainder of the flat face so as to improve the definition of the periphery of the pole face.

Conveniently, the method includes subsequent to the first mentioned indenting operation, a second indenting operation utilising punches shaped to act primarily on the axial peripheral edge regions of the poles to further improve the definition of the axial pole face edges.

Desirably all of the punches in a given operation are moved radially inwardly simultaneously.

Preferably, the side surfaces of the punches are substantially perpendicular to their flat faces such that the width of each punch adjacent its root is less than the width of the respective die at its open face.

The invention further resides in a yoke for a dynamo electric machine, manufactured in accordance with the method specified in the preceding paragraphs.

Once example of the invention is illustrated in the accompanying drawings, wherein:

FIG. 5 is a fragmentary sectional view illustrating the operation of the apparatus shown in FIG. 2;

FIG. 6 is a transverse, fragmentary sectional view of one of the punches of the apparatus shown in FIG. 2;

FIG. 7 is a view similar to FIG. 6 of a first modified punch; and

FIGS. 8, 9 and 10 include respectively end and plan views of three further modified punches.

Figure 1:
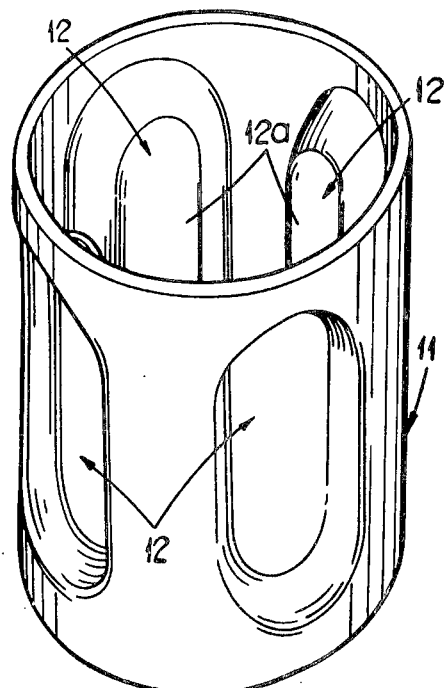
FIG. 1 is a diagrammatic perspective view of a yoke for a starter motor, to be manufactured.

Referring to the drawings, the yoke 11 (FIG. 1) to be manufactured comprises a hollow, mild steel sleeve of circular cross-section having a substantial wall thickness, in the order of 0.200-0.250 inches. Projecting radially inwardly within the yoke are four equi-angularly spaced axially extending poles 12 the poles 12 being integral with the remainder of the yoke. In use, the yoke contains a field winding of sinusoidal form, the winding including in this case, four axially extending portions which extend between the poles 12 respectively and which are integrally interconnected by four curved end portions, circumferentially adjacent curved end portions being at opposite axial ends respectively of the winding. Thus a first curved end portion will extend around the curved end region of the first pole, and the next circumferentially adjacent curved end portion of the winding will extend around the axially opposite curved end portion of the next circumferentially adjacent pole.

Figure 2:
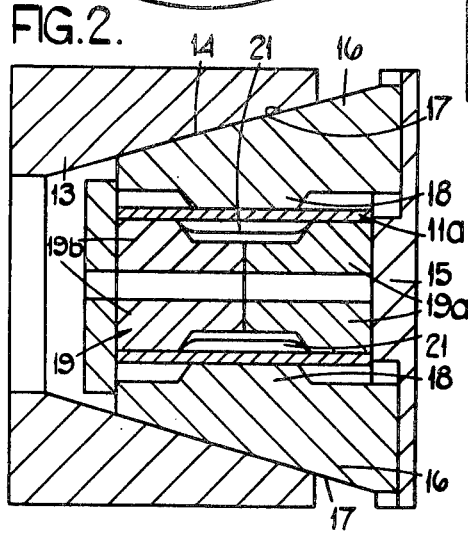
FIG. 2 is a diagrammatic sectional view of the apparatus used in the manufacture of the yoke.
Figure 3:
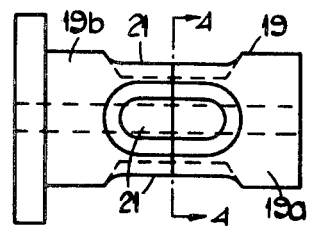
FIG. 3 is a side elevational view of a mandrel for use in the apparatus of FIG. 2.
Figure 4:
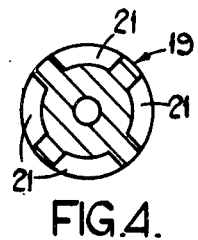
FIG. 4 is a sectional view on the lin 4—4 in FIG. 3.

In order to manufacture the yoke 11 a plain mild steel sleeve 11a of diameter and wall thickness equal to that of the required yoke is deformed to produce the yoke in the apparatus of FIG. 2. The apparatus, in simplified form, comprises an outer sleeve 13 having a frusto-conical inner surface 14. The sleeve 13 is movable axially towards and away from a base plate 15, and extending axially from the base plate and slidable raidally relative thereto are four equi-angularly spaced outer tools 16. The four tools 16 are disposed co-axially of the sleeve 13 and their outer faces 17 are part frusto-conical to mate with the surface 14 of the sleeve 13. Formed on, or carried by the innermost surfaces of the tools 16 are respective punches 18 which are thus presented radially inwardly towards one another.

A mandrel 19 is locatable between the tools 16 aligned with the axis of the sleeve 13. The mandrel 19 is generally cylindrical, and is formed in its outer surface with four equi-angularly spaced recesses defining dies 21. The dies 21 have a shape corresponding to the required shape of the poles 12 within the yoke. The diameter of the mandrel 19 is equal to the internal diameter of the yoke, and therefore the sleeve, and the mandrel is formed in two axially separable parts 19a, 19b to permit removal of the mandrel from the yoke after formation of the yoke.

The mandrel 19 is first assembled within the sleeve 11a, and the mandrel and sleeve are then inserted between the tools 16, the tools 16 being retracted radially away from one another to permit insertion of the mandrel and sleeve. The mandrel 19 is positioned with one axial end abutting the base 15, and the dies 21 radially aligned with the punches 18. Thereafter, the outer sleeve 13 is driven towards the base 15 by hydraulic rams, and during axial movement of the sleeve 13 relative to the base 15 the coaction of the frusto-conical surface 14 of the sleeve 13 with the part-frusto-conical surfaces 17 of the tools 16 drives the tools 16 simultaneously radially inwardly towards the mandrel 19. The punches 18 engage the regions of the sleeve 11a overlying the dies 21, and deform the material of the sleeve radially inwardly into the dies 21 to indent the sleeve, thus producing the poles 12 integral with the remainder of the sleeve 11a. Thereafter the sleeve 13 is retracted axially away from the base 15 and the tools 16 are moved radially outwardly to disengage the punches 18 from the now formed yoke 11. Lastly the two part mandrel is withdrawn from the formed yoke, the part 19a of the mandrel being removed from the opposite axial end of the yoke from the part 19b.

The dies 21 of the mandrel conform exactly to the required shaping of the exterior of the poles within the yoke. However it is found that where a high degree of correlation between the shape of the formed pole and the die shape is required then the shaping of the punches 18 is of importance. It has been found that where the shaping of the punches 18 corresponds exactly to the shaping of the dies 21, then although poles 12 are produced the definition of the exterior surfaces of the poles, that is to say the definition of the pole surface within the interior of the yoke is not of a high degree of accuracy. It may well of course be that in use the definition of the surface shape of the pole is not of critical importance, and in this instance punches 18 corresponding in shape to the dies 21, but of dimensions less than the dimensions of the dies 21 by an amount equal to the sleeve wall thickness could be utilised. Using such tools the lack of shape definition is most noticeable at the peripheral edge of the radially innermost face 12a of the poles, which edge, rather than being a sharp line edge, is a rounded edge 12b best seen in FIG. 5. In effect, utilising such tools, that is to say punches 18 and dies 21, the material of the sleeve 11a is deformed to produce the poles 12, but is not caused to flow into the shaft corners of the dies 21 defining the peripheral edges of the pole faces 12a.

The definition of the peripheral edge regions of the pole faces 12a can be improved using the modified punches 22 shown in FIG. 7. The main difference between the punches 22 and the punches 18 is that where the side surfaces of the punches 18 are inclined at an angle equal to the angle of the side surfaces of the dies 21 the side surfaces 22a of the punches 22 are cut away so that considering a punch 22 seated in a die 21 then the peripheral edge of the front face of the punch would correspond to the peripheral edge of the base of the die, allowing of course, for the thickness of the material of the sleeve 11, and a wedge shaped gap increasing in width from a minimum adjacent the peripheral edge of the front face of the punch 22 would be defined between the side surfaces 22a of the punch and the side surfaces of the die. By comparison using the punch 18 the wedge shaped gap would not be present, and a parallel sided gap of width equal to the wall thickness of the sleeve would be defined.

It will of course be apparent that since an armature assembly is to rotate within the yoke in use, then the radially innermost faces 12a of the poles 12 must be part-cylindrical, and furthermore must be part of a common imaginary cylinder. In all of the aforementioned punches and dies the front face of each of the punches and the base of each of the dies reflects the necessary part cylindrical shaping of the pole faces 12a. However, it has been found that the definition of the edges of the pole faces 12a can be further improved using combinations of the punches shown in FIGS. 8, 9 and 10 in two consecutive operations.

The punches 23, 24, 25 shown in FIGS. 8, 9, and 10 respectively have their side surfaces 23a, 24a, 25a in effect cut away in the same manner as the punch 22. However rather than having a concave cylindrical front face, equivalent to that of the punches 18, 22 the punches 23, 24, 25 have a flat front face indicated by the suffix b. The side surfaces and front surfaces of the punches 23, 24, 25 are generally perpendicular to one another.

The improved definition of the peripheral edges of the pole faces 12a, and in particular the definition of the magnetically important axially extending peripheral edges of the faces 12a is achieved by performing an initial pole forming operation as described above utilising the punches 23 in place of the punches 18 or 22. It is found that utilising the punches 23 without any subsequent secondary operation provides an edge definition superior to that of the punches 18, 22. The punches 24 are similar to the punches 23, but have an axially extending groove 26 disposed in the region of the axial centre-line of the punch front face 24. Pole formation in a single operation utilising the punches 24 gives an edge definition slightly superior to that of the punches 23. It is believed that the improvement in definition achieved with the punches 24 is attributable to the provision of the groove 26. The theory underlying this is that the relieving of the central region of the front face of the punch by means of the groove 26 reduces the work rate of the material being deformed at the centre of the pole form thus allowing more planishing force to be applied to the material adjacent the pole face edges. The actual cross-section of the groove or recess 26 is not thought to be critical, and further grooves, a different shaped groove or grooves or a discontinuous groove or grooves could be used.

A further, and significant improvement in edge definition can be achieved by performing a second operation on the already formed poles using the punches 25. The punches 25 are similar to the punches 24 but have raised ribs 25c along the axial edges of their front faces 25b. The operation is as follows. The sleeve 11a is deformed utilising the punches 23 or 24 and the sleeve 13 is then withdrawn permitting radial withdrawal of the tool 16. The mandrel and sleeve 11a are left in position and the punches 23, or 24 are replaced by the punches 25. The sleeve 13 is then once again moved axially towards the base 15 so that the punches 25 operate on the poles formed in the previous operation. The ribs 25 localise the planishing force applied to the material to the axial peripheral edge regions of the front faces of the poles.

It will be understood that with each of the punches described above the dimensions of the front face of the punch are equal to the dimensions of the base of the die 21 minus the material thickness.

From the foregoing description it will be appreciated that the optimum pole edge definition is produced by a two-stage operation utilising initially the punches 24 and subsequently the punches 25. However, it is believed that for some applications of the yoke such accurate pole edge definition will not be necessary and thus the poles can be produced in a single operation, using punches 18, 22, 23 or 24 depending upon the definition required.

The design of the mandrel can conveniently be such that the internal diameter of the axial end regions of the yoke is sized in the pole forming operation or operations to facilitate fitting to the yoke of the motor end bracket assemblies with a minimum of additional machining of the yoke.

It will be recognised that yokes with integrally formed poles have a number of advantages over more conventional yokes where the poles are separately formed and then attached to the yoke sleeve. For example, there is a significant weight advantage. Furthermore, the number of components is minimised as is the number of air gaps in the magnetic circuit of the yoke. Furthermore, this type of yoke is extremely well suited to receive the sinusoidal type field winding described above. It will be appreciated that since all of the poles are fixtures then the sinusoidal field winding must be expanded into position when the stator assembly including the yoke is constructed.

It is to be understood that while the yoke is particularly suited to the use of a sinusoidal field winding other forms of field winding can be utilised, for example, the more conventional winding where linked coils encircle respective poles can be used.

The form of yoke described above is not limited in its use to internal combustion engine starter motors. Yokes of this form can be utilised, perhaps with minor shape changes where necessary in other dynamo electric machines for example, dynamo's for use in vehicle battery charging systems.

I claim:

1. A method of manufacturing a yoke for a dynamo electric machine comprising: inserting a transversely divided two part cylindrical mandrel into a hollow ferromagnetic sleeve of wall thickness and diameter equal to that of the required yoke, the mandrel having therein a plurality of circumferentially spaced recesses, each recess defining a required pole shape and constituting a die, ensuring that the dies and a plurality of externally located punches are radially aligned, moving the punches radially inwardly relative to the dies to deform the sleeve into said dies, moving the punches radially outward and separating the two part mandrel to permit removal of the yoke.

2. A method as claimed in claim 1 wherein each of said punches presents a flat face to a convex part cylindrical basal face of its respective die.

3. A method as claimed in claim 2 wherein the flat face is recessed adjacent an axial centreline of said punch.

4. A method as claimed in claim 1 including subsequent to the first mentioned deforming step, a second deforming step utilising punches and shaped to act primarily on the axial peripheral edge regions of the poles to further improve the definition of the axial pole face edges.

5. A method as claimed in claim 1 wherein all of the punches are moved radially inwardly simultaneously.

6. A method as claimed in claim 1 wherein the side surfaces of the punches such that the width of each punch adjacent its roots is less than the width of the respective die at its open face.

7. An apparatus for the manufacture of a yoke for a dynamo electric machine, said apparatus comprising:

a transversely divided two part cylindrical mandrel having external dimensions generally corresponding to internal dimensions of a yoke to be manufactured, said mandrel including thereon a plurality of circumferentially spaced recesses, each recess constituting a die defining a required pole shape of said yoke each of said circumferentially spaced recesses having a generally radially extending side wall;

a plurality of externally located punches radially aligned with said circumferentially spaced recesses, said punches having side walls which generally correspond to said recess side walls in a manner such that the radially inner most side walls of said punches and recesses are more closely spaced than the radially outer most walls of said punches and recesses;

means for moving said plurality of punches radially inward and outward of said mandrel with a yoke blank inserted therebetween.

* * * * *